Jan. 23, 1940.  E. S. CORNELL, JR  2,188,176
THERMAL UNIT
Filed May 31, 1935  2 Sheets-Sheet 1
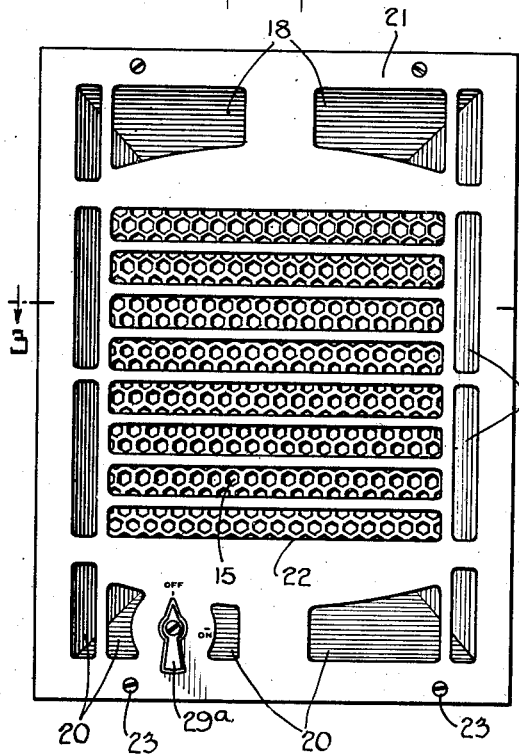
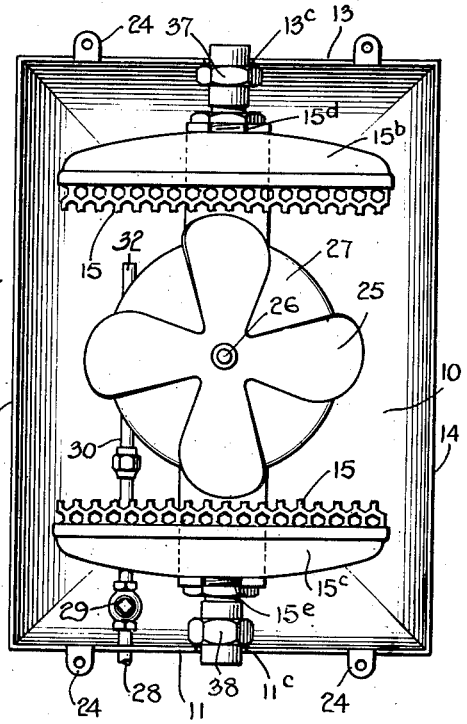
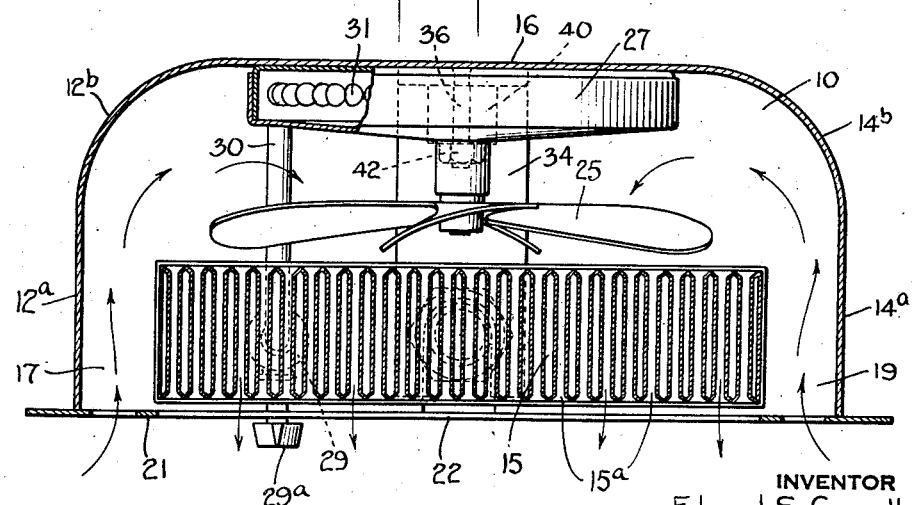
INVENTOR
Edward S. Cornell, Jr.
BY
HIS ATTORNEY Jan. 23, 1940.  E. S. CORNELL, JR  2,188,176
THERMAL UNIT
Filed May 31, 1935  2 Sheets-Sheet 2
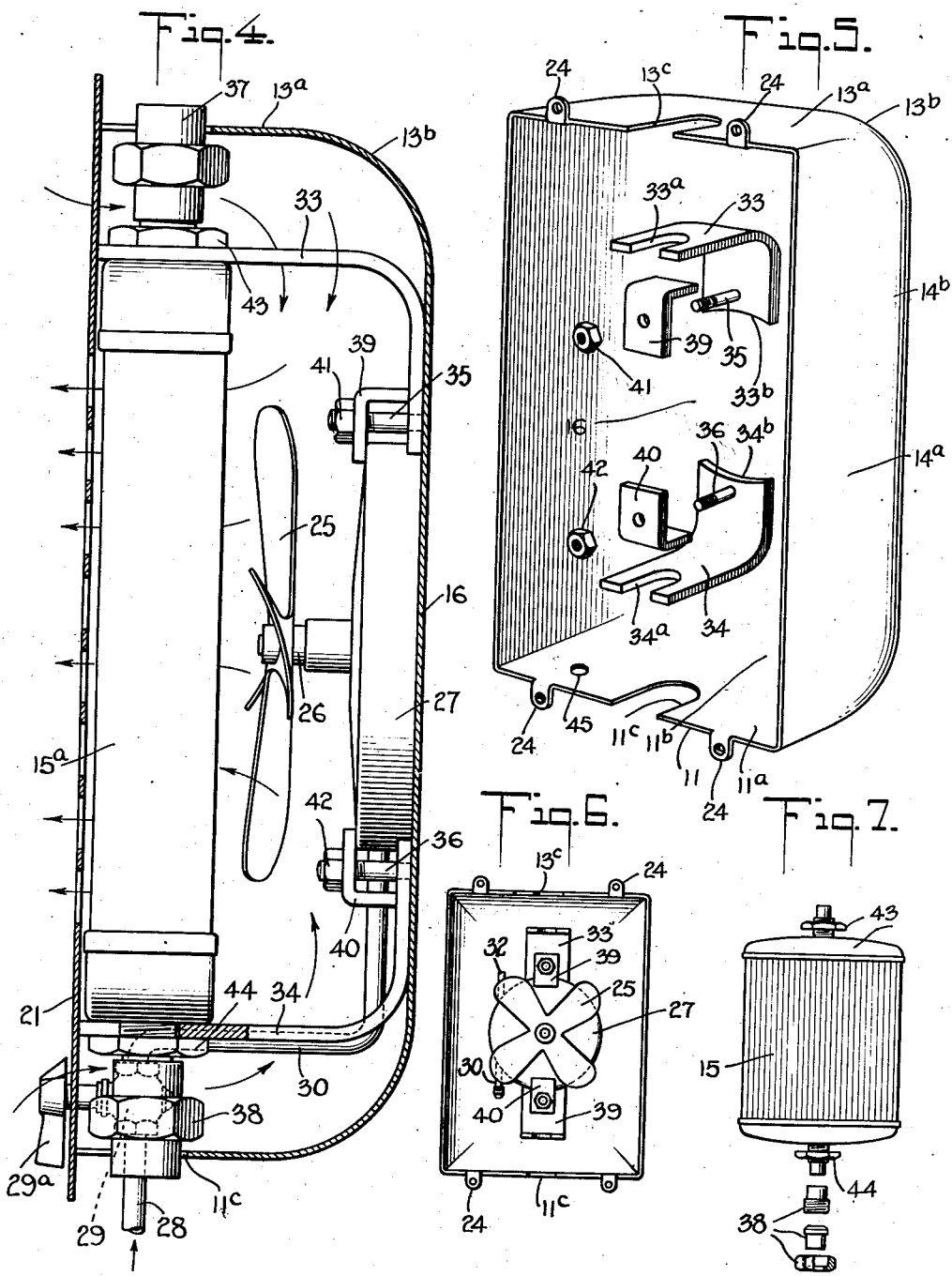
INVENTOR
Edward S. Cornell, Jr.
BY
Henry J. Lucke
HIS ATTORNEY Patented Jan. 23, 1940

2,188,176

UNITED STATES PATENT OFFICE 2,188,176

THERMAL UNIT

Edward S. Cornell, Jr., Larchmont, N. Y., assignor, by mesne assignments, to American Radiator & Standard Sanitary Corporation, New York, N. Y., a corporation of Delaware Application May 31, 1935, Serial No. 24,283

1 Claim. (Cl. 257—137)

The present invention relates to an improved unit comprising a casing for enclosing and supporting a radiator unit the facial area of which is less than the facial area of the casing, and a fan and air motor or other fan-actuating means, for projecting air in thermal exchange relation with the thermal surfaces of the thermal member and/or for re-circulating air of the room or other space served by the stated combined thermal unit.

More specifically, my improved thermal unit comprises an open front provided with a preferably removable grill, a thermal member formed of sets of channels suitably spaced from one another for affording the flow of a thermal fluid, the exposed faces of such channel being disposed in suitable relationship with the openings of the grill, a motor, preferably of air propulsion type, and a fan mounted directly or in other driven relationship with the shaft of the motor, such fan being disposed in air projecting relationship with the exposed faces of the channels of the thermal member, and common means for unitarily mounting the stated instrumentalities within the casing and in the stated relationship to one another.

Embodiments of my invention are especially adapted to be disposed within recesses in a wall of a room or other space served by the thermal unit, the grill being arranged to be substantially flush with the exposed face of the wall and constructed to conceal the clearances between the side and end walls of the casing and the material defining the recess in the wall, the piping connecting the thermal unit with the thermal source and the piping for supplying compressed or other pressure differential air extending within and thus concealed by the material constituting the wall.

Further features and objects of the invention will be more fully understood from the following detail description and the accompanying drawings, in which Fig. 1 is a front view of a preferred embodiment of my invention.

Fig. 2 is a front elevation of Fig. 1, the grill having been removed and other parts omitted for the purpose of bringing to view otherwise hidden parts.

Fig. 3 is a horizontal sectional view on line 3—3 of Fig. 1, on a somewhat enlarged scale.

Fig. 4 is a central vertical sectional view of Fig. 1, taken on an enlarged scale.

Fig. 5 is a perspective view of the preferred form of casing illustrated in the preceding figures, on the scale of Figs. 1 and 2.

Fig. 6 is a front elevation of Fig. 5, on a reduced scale, showing the positioning of the air motor and fan.

Fig. 7 is a front elevation of the thermal member, together with an exploded view of its joint fittings.

Referring to the drawings, the casing 10 is shown having its front edges 11, 12, 13, 14, disposed in a substantially vertical plane, defining the front opening of the casing. The side and end walls of the casing, 11a, 12a, 13a, 14a, extend at the front portion of the casing substantially rectilinearly and substantially normal to the respective front edges 11, 12, 13, and 14, but at a location rearwardly of the space occupied by the thermal member, i. e., heat exchanger 15; and as appears more fully hereinafter, the side and end walls, see 11b, 12b, 13b, 14b, extend arcuately on opposite sides toward one another and merge with the rear wall 16 of the casing.

The thermal member may be constructed as preferred, the essentials comprising, inter alia, that its front face 15a has a facial area less than that of the front opening of the casing 10 and an outline conforming to, but as above pointed out less in dimension than, the outline of the front opening of the casing, whereby there is provided at the lateral sides of the thermal member and the respective side and end portions 11a, 12a, 13a, and 14a of the casing, channels, see 17, 18, 19 and 20 for the inflow of air toward and to the fan.

Coacting with such thermal member and the air flow effecting and projecting means, I provide a front plate or grill 21, equipped with perforations corresponding to and defining cooperatively with the outline of any particular thermal member 15 and the stated walls of the casing 10 the stated paths of air inflow 17, 18, 19 and 20, such front plate or grill 21 further having the central perforations 22 providing and defining the paths of outflow of the air projected by the fan, said paths of flow being referred to more fully hereinafter. Such flow of air outwardly of the casing is in thermal exchange relation with the heating surfaces of the thermal member 15.

Such front plate or grill 21 serves also to substantially conceal the stated parts disposed within the interior of the casing 10. Such front plate 21 may be positioned in any suitable manner, conveniently by means of set screws, see 23, the tapped ends of which are received within threaded openings of the lugs 24 or equivalent carried by or at the front edges of the casing 10.

Advantageously, such front plate or grill 21 serves also to conceal the clearances between the side and end walls of the casing 10 and the roughing-out opening made within the partition, wall or the like within which the assembly is installed.

The air projecting means is shown comprising a fan 25, or equivalent, positioned to project air in substantial parallelism with respect to the rectilinear portions 11a, 12a, 13a, 14a of the side and end walls of the casing 10 and in substantial alignment with the channels 15a intervening between the exposed faces of the thermal member 15, the direction of air flow of which is indicated by the applied arrows, thence through the central perforations 22, shown in the form of horizontally extending slots, in the front plate or grill 21. For a type of fan 25 as indicated in the drawings, such fan may be directly mounted upon the shaft 26 of the motor 27, which may be of any suitable type.

Such motor 27 in fulfillment of the objects and purposes set forth in my copending application Ser. #687,376, filed August 29, 1933, entitled Air conditioned heating and cooling system, now U. S. Patent No. 2,038,347, patented April 21, 1936, is an air motor, actuated by compressed air, connected by suitable piping, see inflow pipe 28 equipped with a valve 29, controlled by its setting member 29a, in turn communicating with the pipe 30 leading to the intake of the air motor 27. Such air motor advantageously has the construction described and claimed in my U. S. Patents #1,926,527, entitled Suction driven prime mover, granted September 12, 1933, and #1,926,528, entitled Air motor, granted September 12, 1933, embodying inter alia a rotor 31 of suitable construction. The outtake of my air motor is indicated at 32, see Figs. 2 and 6, the air discharged therefrom merging with the re-circulated air of the room or other space served by the unit, the paths of flow of which are set forth hereinabove, and indicated in the drawings by the applied arrows.

Preferably, as also shown in the drawings, the air motor 27 and fan 25 are assembled as a unit, and for convenience, accuracy and maintenance of position, I provide in association with the casing 10, namely on the inner face of its rear wall 16 the brackets 33, 34, arranged vertically one above the other and suitably secured, as by spot welding or equivalent, to the inner face of the rear wall 16. Associated with each bracket 33 I further provide suitable arms 35, 36 secured to and projecting from the vertically extending portions of the brackets 33, 34, respectively, the outer ends of such arms 35, 36 being threaded or equivalent; each bracket 33, 34, at its outer end is provided with a slot 33a, 34a, or equivalent, open at its terminus, i. e., front, the purposes of which will appear. Such slots 33a, 34a, are located in substantial vertical alignment with one another and also in substantial vertical alignment with the slot 11c in the lower end wall 11a and the slot 13c in the upper end wall 13a.

As above indicated, the thermal member 15 is of any suitable construction, and usually includes upper and lower header parts 15b, 15c, provided respectively with the ports 15d, 15e, adapted to be connected by nipples, unions 37, 38 or equivalent with piping for the supply to and discharge from of the thermal fluid supplied from an individual or central heating and/or cooling device.

The stated fan 25 and air motor 27 or equivalent and the stated thermal member 15 and their stated or equivalent appurtenant parts are now assembled accurately and maintained in position, as will now appear:

The combined fan 25 and air motor 27 assembly is placed with the rear wall of the air motor 27 in facial engagement with the inner face of the rear wall 16 of the casing 10, the circular or other arcuate side wall of the housing of the air motor 27 being received within and retained by the arcuate edges 33b and 34b of the respective brackets 33, 34, and clamped in position by the angle plates 39, 40, or equivalent, the latter being provided with suitable openings through which the ends of the arms 35, 36 are passed, and the assembly thus positioned as a unit as predetermined and maintained as a unit in position by nuts 41, 42, respectively, or equivalent, threading with the threading ends of the arms 35, 36.

The nipples 15d, 15e, are respectively passed into the open ended slots 33a, 34a of the respective brackets 33, 34 and secured in position by locking nuts 43, 44, and the unions 37, 38 or equivalent are received within the open-ended slots 11c, 13c of the end walls of the casing 10, thus conveniently and accurately installing and maintaining in position the stated parts with respect to the casing.

The opening 45, or equivalent, shown in the bottom end wall portion 11a, serves to receive the piping 28 for the supply of air for actuating the motor 27; pursuant to my air conditioned thermal system set forth in my aforesaid application Serial No. 687,376, such air is conditioned and compressed to proper pressure.

The front plate or grill 21 is then installed in position by set screws 23, or equivalent, and the finger piece 29a of the control valve 29 is positioned on its operating stem.

From the above, it appears that the brackets 33, 34, assembled as above stated or equivalently in predetermined relation to the walls of the housing 10, i. e. by welding or integral material of the brackets 33, 34, or equivalent, together with predetermined dimensioning and locations of the assembly parts, i. e. slots 33a, 34a, contoured faces 33b, 34b, arms 35, 36, or equivalent, further the predetermined dimensions and positions of the assembly slots 11c, 13, or equivalent of the housing 10, and the correlated contour and dimensions of the parts assembled with the aforesaid assembly accuracy and permanency of assembly are assured.

As is set forth in my aforesaid patent application, Serial No. 687,376, now U. S. Patent No. 2,038,347, patented April 21, 1936, entitled Air conditioned heating and cooling system, my thermal system is applicable for cooling a room or other space served individually by a thermal unit of the system, as well as for heating the same; also, as indicated above, my thermal unit may be supplied with a thermal fluid individually by a suitable source of thermal fluid or a group of thermal units may be respectively supplied with thermal fluid from a central source of thermal fluid.

From my discoveries of field installations of my invention, the outer configuration of the thermal member bears a definite relation to the configuration of the open front of the casing, in the attainment of efficiency of exchange of thermal energy, i. e., B. t. u.'s and the energy value of the compressed air supplied to the air motor in the actuation of the fan for projecting air through and in heat exchange contact with the effective surfaces of the reticulated thermal member and the control of the temperature of the room or other space served by the thermal unit. In general, optimum results are obtained by forming the outer configuration of the thermal member symmetrical with the configuration of the open front of the casing, or vice versa, and by positioning the thermal member within and in symmetrical relationship with the open front of the casing, whereby as indicated by the arrows applied in the drawings, see Figs. 3 and 4 in particular, inflow of air takes place through the passages afforded between the outer configuration of the thermal member and the walls defining the open front of the casing and completely about the thermal member, the outflow of air taking place through the heating passages through the reticulated thermal member, the fan being disposed posteriorly of the thermal member and circumscribing a path in substantially symmetrical relation to the heating passages of the reticulated thermal member.

My discoveries have also shown, so far as has been verified, that efficiency is enhanced by the employment of a thermal member having flat faces about its outer configuration in combination with flat, i. e., rectilinearly extending wall portions defining the open front of the casing, said rectilinear wall portions posteriorly of the thermal member being arcuate and preferably uniformly arcuate, the stated arcuate portions of the respective side end and walls of the casing merging in a substantially flat, i. e. rectilinear rear wall of the casing.

The front plate or grill is perforated to effect the desired degree of concealment of the stated essential members enclosed within the casing, with such artistic effect as may be preferred, such perforations, however, as above indicated being located in correspondence to the stated paths of inflow and outflow of the air.

I claim:

In a thermal unit embodying a casing having a front opening and provided with a rear closure, a heat exchanger disposed within said casing and arranged for the passage of thermal fluid therethrough and having a facial area less than the front opening of the casing thereby providing channels for the inflow of air and a motor-driven fan for enforcing a circulation of air into heat exchange contact with said heat exchanger, means wholly supported by said rear closure to afford definite positioning and positive securement of said heat exchanger and said fan motor, said means including brackets having spaced arms secured to said rear closure and arranged mutually to cradle said fan motor in definite position on said rear closure, clamping means arranged to cooperate with said arms in holding said fan motor against said rear closure, a spaced, forwardly projecting arm integral with each of said first-mentioned arms, arranged in combination to embrace said heat exchanger, and locking means arranged to secure the positioning of said heat exchanger with respect to said forwardly projecting arms and in its channel-forming position with relation to the casing.

EDWARD S. CORNELL, Jr.